(12) United States Patent
Death et al.

(10) Patent No.: US 11,181,422 B2
(45) Date of Patent: Nov. 23, 2021

(54) SPECTROPHOTOMETER CALIBRATION METHODS AND SYSTEMS

(71) Applicant: Agilent Technologies, Inc., Santa Clara, CA (US)

(72) Inventors: David Death, Melbourne (AU); Philip Valmont Wilson, Mount Waverly (AU)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/050,678

(22) PCT Filed: Apr. 23, 2019

(86) PCT No.: PCT/IB2019/053318
§ 371 (c)(1),
(2) Date: Oct. 26, 2020

(87) PCT Pub. No.: WO2019/207465
PCT Pub. Date: Oct. 31, 2019

(65) Prior Publication Data
US 2021/0231494 A1  Jul. 29, 2021

(30) Foreign Application Priority Data

Apr. 24, 2018 (AU) ................................ 2018901361
Oct. 31, 2018 (AU) ................................ 2018904139

(51) Int. Cl.
*G01J 3/28* (2006.01)
*G01J 3/02* (2006.01)
(Continued)

(52) U.S. Cl.
CPC ............. *G01J 3/0297* (2013.01); *G01J 3/027* (2013.01); *G01J 3/10* (2013.01); *G01J 3/18* (2013.01);
(Continued)

(58) Field of Classification Search
CPC ..... G01J 3/0297; G01J 3/10; G01J 3/28; G01J 3/18; G01J 3/027; G01J 2003/1208;
(Continued)

(56) References Cited

U.S. PATENT DOCUMENTS 6,226,084 B1  5/2001  Tormod
6,377,899 B1  4/2002  Sakai et al.
(Continued)

FOREIGN PATENT DOCUMENTS

JP  2018009457 A  1/2018

OTHER PUBLICATIONS

International Search Report and Written Opinion dated Aug. 2, 2019, Application No. PCT/IB2019/053318, 8 pages.

*Primary Examiner* — Abdullahi Nur

(57) ABSTRACT

A method of calibrating a spectrophotometer comprising a flash lamp. The method comprises receiving light from the flash lamp at a monochromator of the spectrometer, wherein the flash lamp is a short arc noble gas flash lamp with transverse or axially aligned electrodes; configuring the monochromator to progressively transmit the received light at each of a plurality wavelengths of a selected range of wavelengths, wherein the range of wavelengths is associated with a wavelength feature according to a known spectral profile of the flash lamp, and wherein the wavelength feature is a self-absorption feature; and determining a spectrum of the flash lamp, wherein the spectrum comprises a corresponding power or intensity value for each of the plurality of wavelengths. The method further comprises determining a wavelength calibration error value for the wavelength feature by comparing the spectrum with a segment of a predetermined reference spectrum associated with the flash lamp, wherein the segment of the predetermined reference spectrum includes one or more wavelengths associated with
(Continued)

the self-absorption feature; and calibrating the spectrophotometer based on the wavelength calibration error value.

17 Claims, 8 Drawing Sheets

(51) Int. Cl.
 G01J 3/18 (2006.01)
 G01J 3/10 (2006.01)
 H01J 61/80 (2006.01)
 G01J 3/12 (2006.01)
 H01J 61/16 (2006.01)
(52) U.S. Cl.
 CPC ............... *G01J 3/28* (2013.01); *G01J 3/021* (2013.01); *G01J 2003/104* (2013.01); *G01J 2003/1208* (2013.01); *G01J 2003/1814* (2013.01); *G01J 2003/2866* (2013.01); *H01J 61/16* (2013.01); *H01J 61/80* (2013.01)
(58) Field of Classification Search
 CPC ......... G01J 2003/1814; G01J 2003/104; G01J 2003/2866; G01J 3/021; H01J 61/16; H01J 61/80
 See application file for complete search history.

(56) References Cited

U.S. PATENT DOCUMENTS

| 6,684,099 | B2 | 1/2004 | Ridder et al. | |
| 8,717,557 | B2* | 5/2014 | Tobe | G01J 3/0297 356/300 |
| 9,182,336 | B2 | 11/2015 | Cassady et al. | |
| 2015/0377701 | A1 | 12/2015 | Pawluczyk et al. | |

* cited by examiner

SPECTROPHOTOMETER CALIBRATION METHODS AND SYSTEMS

CROSS-REFERENCE TO RELATED APPLICATIONS

This application is a national stage entry pursuant to 35 U.S.C. § 371 of International Application No. PCT/M2019/053318, filed Apr. 23, 2019, which claims priority to Australian Patent Application No. 2018901361, filed Apr. 24, 2018, and Australian Patent Application No. 2018904139, filed Oct. 31, 2018, the contents of all which are incorporated herein by reference in their entirety.

TECHNICAL FIELD

The present disclosure generally relates to spectrophotometer calibration methods and systems.

BACKGROUND

Spectrophotometers are instruments used for the analysis of samples to identify the presence of or determine the concentrations of materials or substances (e.g. molecules, elements, or compounds) of interest, i.e. the analyte. Spectrophotometers are configured to direct electromagnetic energy in the form of light in the ultraviolet (UV), visible or infrared (IR) range from a source to a sample. For example, a method of UV-visible spectroscopy exposes samples to light in the UV-visible range. By measuring the characteristics of the resultant light following interaction with the sample (for example, the light intensity and/or wavelengths of light transmitted, absorbed, scattered or emitted by the sample), a type of analyte or amount of analyte can be evaluated. For example, an amount of optical absorption associated with the sample can be related to an analyte concentration.

Flash lamps are often used as a light source for performing spectroscopy as they typically produce uniformly bright and spectrally broad light emissions. A flash lamp is a type of gas-filled electrical arc lamp comprising a pair of opposed discharge electrodes contained in an envelope of gas through which a current pulse is passed to create an electrical arc. During a period of electrical discharge, gas inside the volume of the arc is heated and ionized to create a plasma. Light emitted from the arc is a mixture of discrete emissions from exited atoms and ions and broadband emissions from the hot plasma between the electrodes.

Spectrophotometers generally require calibration to confidently obtain accurate wavelength and spectral bandwidth measurements. Generally, a source different to the light source routinely employed in the spectrophotometer is used for calibration purposes. For example, a Mercury arc lamp is sometimes used for calibration due to the number and sharpness of emission lines it produces.

SUMMARY OF THE INVENTION

Some embodiments relate to a method of calibrating a spectrophotometer comprising a flash lamp, the method comprising: receiving light from the flash lamp at a monochromator of the spectrometer, wherein the flash lamp is a short arc noble gas flash lamp with transverse or axially aligned electrodes; configuring the monochromator to progressively transmit the received light at each of a plurality of wavelengths of a selected range of wavelengths, wherein the range of wavelengths is associated with a wavelength feature according to a known spectral profile of the flash lamp, and wherein the wavelength feature is a self-absorption feature; determining a spectrum of the flash lamp, wherein the spectrum comprises a corresponding power or intensity value for each of the plurality of wavelengths; determining a wavelength calibration error value for the wavelength feature by comparing the spectrum with a segment of a predetermined reference spectrum associated with the flash lamp, wherein the segment of the predetermined reference spectrum includes one or more wavelengths associated with the self-absorption feature; and calibrating the spectrophotometer based on the wavelength calibration error value.

The range of wavelengths may be selected to be substantially centred about a wavelength associated with the self-absorption feature from the known spectral profile of the flash lamp.

In some embodiments, the method further comprises determining one or more further wavelength calibration errors; and calibrating the spectrophotometer based on the first wavelength calibration error value and the one or more further wavelength calibration errors. Determining one or more further wavelength calibration errors may comprise configuring the monochromator to progressively transmit the received light at each of a further plurality wavelengths of a selected further range of wavelengths, wherein the further range of wavelengths is associated with a further wavelength feature according to a known spectral profile of the flash lamp; determining a further spectrum of the flash lamp, wherein the further spectrum comprises a corresponding power or intensity value for each of the further plurality of wavelengths; determining a further wavelength calibration error value for the further wavelength feature by comparing the further spectrum with a further segment of a predetermined reference spectrum associated with the flash lamp, wherein the further segment of the predetermined reference spectrum includes one or more wavelengths associated with the further wavelength feature. For example, the further wavelength feature may comprise one or more of (i) a further self-absorption feature and (ii) an emission feature.

In some embodiments, the method further comprises selecting a plurality of calibration error value and associated wavelength pairs, wherein the plurality of pairs includes the first wavelength calibration error value and at least two of the one or more further wavelength calibration errors; fitting the plurality of calibration error value and associated wavelength pairs to a least squares quadratic curve to determine parameter values for a representative equation of the curve; and determining the wavelength calibration error value for a particular wavelength from the representative equation using the determined parameter values.

For example, the representative equation may be $\delta\lambda = E\lambda^2 + F\lambda$, wherein $\delta\lambda$ is the wavelength calibration error, $\lambda$ is the associated wavelength and E and F are the parameter values.

In some embodiments, determining the wavelength calibration error value for a wavelength feature comprises: determining a plurality of offset spectra from the determined spectrum, wherein each offset spectrum is associated with a corresponding offset value; determining a plurality of correlation values indicative of a correlation between each of the plurality of the offset spectra and the segment of the predetermined reference spectrum; determining a best fit of at least a subset of correlation values and corresponding offset value pairs to a representative correlation curve to determine correlation parameter values for the representative correlation curve; and determining the wavelength calibration error value for wavelength feature based on the determined correlation parameter values.

In some embodiments, the method further comprises determining a maximum correlation value of the determined correlation values and centring the subset of offset value and correlation value pairs on the maximum correlation value. The offset spectrum may comprise a version of the determined spectrum wherein the wavelengths have been shifted by an offset value.

In some embodiments, the monochromator is configured to transmit light at each of the plurality of wavelengths by progressively varying the rotation angle of at least the diffraction grating of the monochromator of the spectrophotometer.

In some embodiments, calibrating the spectrophotometer comprises determining a rotation angle adjustment value based on the wavelength calibration error value and adjusting a rotation angle of the diffraction grating of the monochromator of the spectrometer by the rotation angle adjustment value.

In some embodiments, the flash lamp comprises Xenon gas.

In some embodiments, configuring the monochromator to progressively transmit the received light at each of a plurality wavelengths of a selected range of wavelengths comprises configuring the monochromator to scan at a relatively high resolution. For example, at least some of the plurality of wavelengths of the selected range may be spaced apart at a wavelength in the range of about 0.05 nm to about 0.5 nm.

Some embodiments relate to a method of calibrating a spectrophotometer comprising a flash lamp, the method comprising: receiving light from the flash lamp at a monochromator of the spectrometer, wherein the flash lamp is a short arc noble gas flash lamp with transverse or axially aligned electrodes; configuring the monochromator to progressively transmit the received light at each of a plurality wavelengths of a selected range of wavelengths, wherein the range of wavelengths is associated with a wavelength feature according to a known spectral profile of the flash lamp, and wherein the wavelength feature is a self-absorption feature; determining a spectrum of the flash lamp, wherein the spectrum comprises a corresponding power or intensity value for each of the plurality of wavelengths; considering the self-absorption features of the determined spectrum as an inverted peak; evaluating a peak centre of the inverted peak; calibrating the spectrophotometer based on the evaluated peak centre.

Some embodiments relate to a spectrophotometer comprising: a short arc noble gas flash lamp with transverse or axially aligned electrodes; a monochromator arranged to receive light from the flash lamp and to progressively transmit light at each of a plurality of selected wavelengths from a range of wavelengths; a detector arranged to detect a corresponding intensity value for each of the first plurality of selected wavelengths; and a computing device comprising a processor and a storage medium, wherein the processor is configured to execute instructions stored on the storage medium to cause the spectrophotometer to perform the method of any of the described embodiments.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters: form part of the prior art base; were common general knowledge in the field relevant to the present disclosure as it existed before the priority date of each claim of this application; or could have been understood, regarded as relevant or reasonably expected to have been combined by a person skilled in the art.

BRIEF DESCRIPTION OF DRAWINGS

Embodiments are described in further detail below, by way of example, with reference to the accompanying drawings briefly described below:

FIGS. 7B and 7C each show a multiple line graph illustrating a further example segment of the reference spectrum and a corresponding segment of the scanned spectrum for a different feature wavelength of the source spectrum.

FIG. 8 further illustrates a line graph providing a curve of best fit for the scatter plot.

FIG. 9 further illustrates a line graph providing a curve of best fit for the scatter plot.

DESCRIPTION OF EMBODIMENTS

Described embodiments relate to methods of calibrating spectrophotometers using flash lamps. It has been recognised by the inventors that in addition to showing emission lines, output spectral profiles of flash lamps also show self-absorption features (notches). These self-absorption features originate in the low lying energy levels of the atoms of the gas in the flash lamp and because the gas responsible for the absorption is much cooler than that responsible for the emission, the absorption lines are relatively narrow and are located within the emission profile of flash lamp. As flash lamps comprising particular gases have known spectral profiles, a comparison of the emission profile of the flash lamp, and in particular, the absorption features of the emission lines, with the known spectral profile for that particular type of flash lamp, the spectrophotometer can be calibrated.

By using flash lamps for calibrating spectrophotometers, the need for a different light source (for example, one that emits narrow spectral emission features at well-known spectral positions) to be used for calibration of the spectrophotometer than is used for performing spectroscopy is eliminated. In addition to performing a comparison of the flash lamp's spectral profile or measured spectra with segments of a predetermined reference spectrum, alternative approaches may consider the self-absorption features/notch of the flash lamp as an inverted peak and further evaluate the peak centre. Such an approach desirably does not require a previously identified or stored reference spectrum segment to compare against but instead utilizes knowledge of the flash lamp's self-absorption features/notch wavelength in spectral evaluation.

Figure 1:
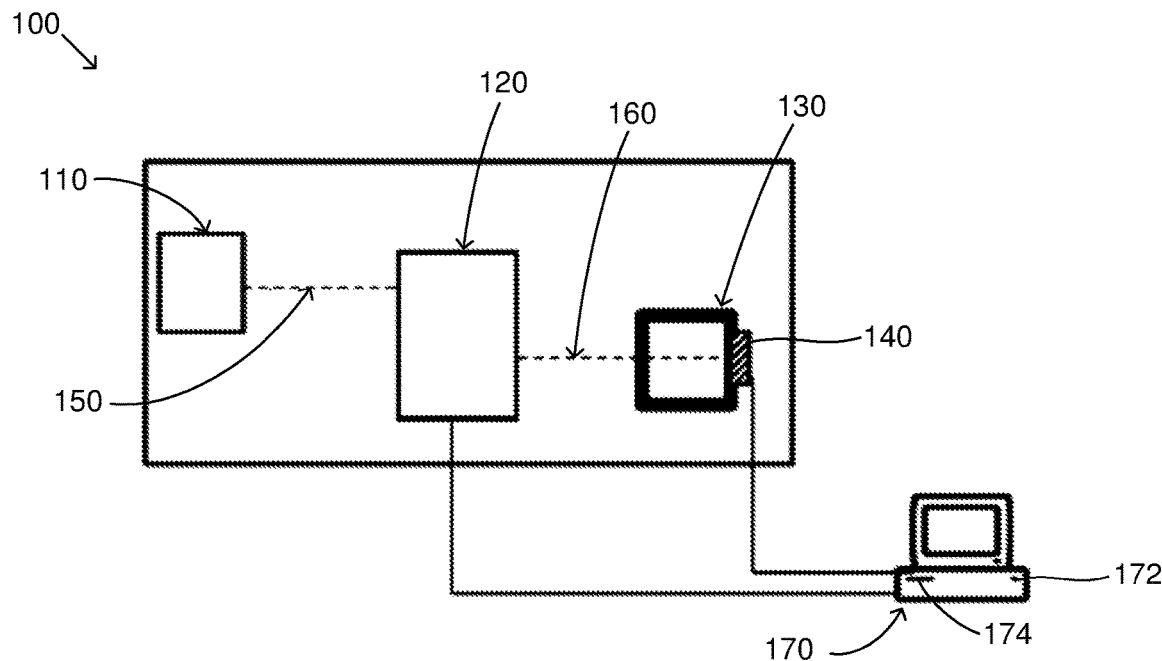
FIG. 1 is a block diagram of a spectrophotometer.

Referring to FIG. 1, a spectrophotometer 100 is shown comprising a flash lamp 110, such as a gas-filled electrical arc lamp, a monochromator 120, at least one sample holder 130 and at least one detector 140. The sample holder 130 is configured to receive and reproducibly position a sample cell (not shown) in a fixed location. The sample cell is configured to receive a sample to be analysed in the spectrophotometer 100.

The flash lamp 110 is configured to produce and provide light 150, such as broadband light, to the monochromator 120. The monochromator 120 is configured to disperse or split the light into constituent wavelengths and to provide substantially monochromatic light 160 to the sample holder 130 to be detected by the detector 140. The monochromatic light 160 may, for example, have a relatively narrow bandwidth in the range of 0.1 to 5 nm. During calibration, the sample holder 130 tends to be left empty, i.e., no sample is provided in the sample holder 130.

In some embodiments, the spectrophotometer 100 and/or the monochromator 120 may be controlled by a computing device 170. The computing device 170 may comprise a processor 172 and a storage medium 174. The storage medium 174 may be a non-volatile storage medium such as a hard disk drive or a solid-state memory device. The processor 172 may be configured to execute instructions (program code) stored in the storage medium 174 to cause the computing device 170 to record the intensity of light 160 detected by detector 140. The processor 172 may be configured to execute instructions (program code) stored in the storage medium 174 to cause the monochromator 120 to vary the wavelength of light being provided to the sample holder 130.

The processor 172 may be configured to execute instructions (program code) stored in the storage medium 174 to progressively configure the monochromator 120 to cause the monochromator 120 to transmit light at each of a plurality of selected wavelengths within a range of wavelengths by progressively varying (scanning) the selected wavelength and to determine, detect and/or measure the respective light intensity or light power received at the detector 140 for each selected wavelength. The range of wavelengths is associated with a self-absorption feature according to a known spectral profile of the flash lamp. In some embodiments, the monochromator 120 is scanned at a relatively narrow range of wavelengths (high resolution) in order to accurately detect one or more of the self-absorption features in the spectral profile of the flash lamp 110.

In some embodiments, the monochromator 120 may be configured to transmit light based on calibration parameters stored in the storage medium 174 of the computing device 170 or retrieved from an external database, for example. The calibration parameters may comprise instrument settings or configurations that when applied to the monochromator 120 cause the monochromator 120 to transmit light at the selected (predetermined) wavelengths. For example, the instrument settings may relate to orientations, rotation angles and/or positions of optical elements, such as a diffraction grating 204 (FIG. 2), within the monochromator 120.

The flash lamp 110 may be a relatively high output flash lamp. In some embodiments, the flash lamp 110 is capable of producing a pulsed light output with an energy of up to about 0.5 J per pulse (flash) at a rate of up to 300 Hz. The flash lamp 110 may produce light over a range of wavelengths. In some embodiments, the flash lamp 110 may be configured to produce light over a select range of wavelengths between about 190 nm to about 3300 nm. The flash lamp 110 may be a short-arc flash lamp comprising electrodes contained in pressurised Xenon gas. For example, the flash lamp 110 may comprise a 1100 series FX-1160 short-arc flash lamp, such as that produced by Excelitas Technologies or a similar flash lamp produced by Hamamatsu.

The spectrophotometer 100 may further comprise a temperature sensor (not shown) connected to the processor 172 for measuring the temperature within the spectrophotometer 100. As explained in further detail below, in some embodiments, the sensed temperature may be used in determining a calibration parameter for the spectrophotometer 100 and/or when calibrating the spectrophotometer 100.

Figure 2:
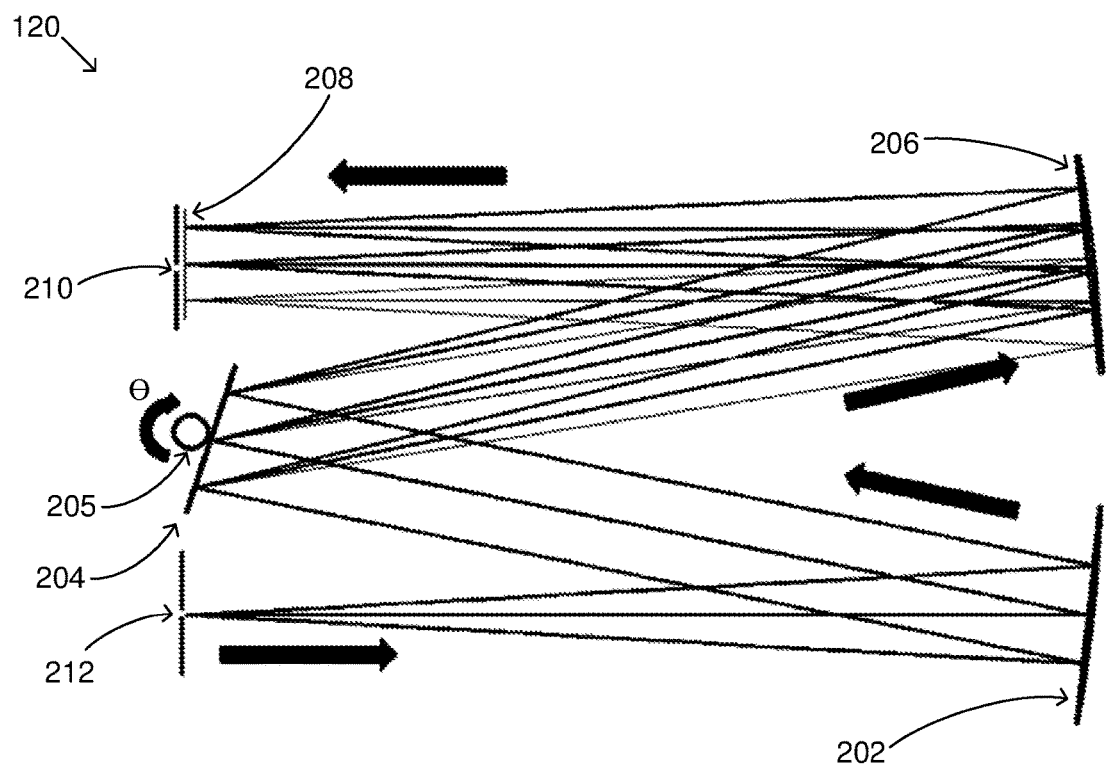
FIG. 2 is a schematic diagram of a monochromator of the spectrophotometer of FIG. 1, according to some embodiments.

Referring to FIG. 2, there is shown a monochromator 120 of the spectrophotometer 100, according to some embodiments. As illustrated, the monochromator 120 may comprise a plurality of optical elements including a first mirror (collimation mirror) 202, a wavelength dispersive element (such as a diffraction grating 204) and a second mirror 206. The monochromator 120 may also comprise an entry slit 212 between the flash lamp 110 (FIG. 1) and the diffraction grating 204 for assisting in calibration and/or collimation of light from the flash lamp 110.

The monochromator 120 may further comprise one or more drive components 205 coupled to one or more of the optical elements. The one or more drive components 205 may be configured to selectively adjust the orientation and/or rotation angle of the one or more optical elements. For example, drive component 205 may be coupled to the diffraction grating 204 and configured to selectively adjust the rotation angle of the diffraction grating 204. The drive components 205 may comprise a direct drive component such as a stepper motor or DC servo motor. Alternatively, the drive components 205 may comprise an indirect drive component with a mechanical linkage such as a sine bar (lever arm) drive from a micro-meter or a pinion and sector gear.

By adjusting the rotation angle of the diffraction grating 204, the monochromator 120 may be configured to transmit light at different selected wavelengths. In some embodiments, the processor 174 is configured to execute instructions to cause the one or more drive components 205 to adjust the rotation angle of the one or more optical elements to cause the monochromator to transmit light at select wavelengths. For each selected rotation angle of the one or more optical components, light at associated wavelengths is dispersed and each wavelength is focused by the second mirror (focusing mirror) 206 to a different location at a focal plane 208.

In some embodiments, the processor 172 may be configured to select a set of rotation angles for the one or more optical elements, which may correspond to evenly spaced wavelength increments, to thereby select a range of evenly spaced wavelengths of light. By detecting the light at the focal plane with detector 140, progressive variation of the rotation angle of the one or more optical elements results in progressive variation of the wavelength of light detected. Therefore, a plurality of detected light intensities each corresponding to selected wavelengths over a range of wavelengths can be recorded, for example in the storage medium 174, in order to determine or measure a scanned light intensity spectrum.

In some embodiments, the rotation angle ($\theta_m$) of the diffraction grating 204 is related to a selected wavelength ($\lambda$) according to the grating equation:

$$d \cdot \sin(\theta_m) = m \cdot \lambda$$

where d is the spacing between diffracting elements of the diffraction grating 204 and m is an integer relating to the order of diffraction.

In some embodiments, the monochromator 120 further comprises an exit aperture 210 located at or adjacent the focal plane 208 to transmit substantially monochromatic light. For example, light may be transmitted at a relatively narrow bandwidth may be in the range of 0.1 to 5 nm. The exit aperture 210 may be adjustable. For example, the exit aperture 210 may comprise a slit or an iris to select the relatively narrow bandwidth of wavelengths transmitted. The monochromators may further comprise an entrance aperture (not shown) which may be adjustable. For example, the entrance aperture (not shown) may comprise a slit or an iris to select the relatively narrow bandwidth of wavelengths transmitted.

Figure 3:
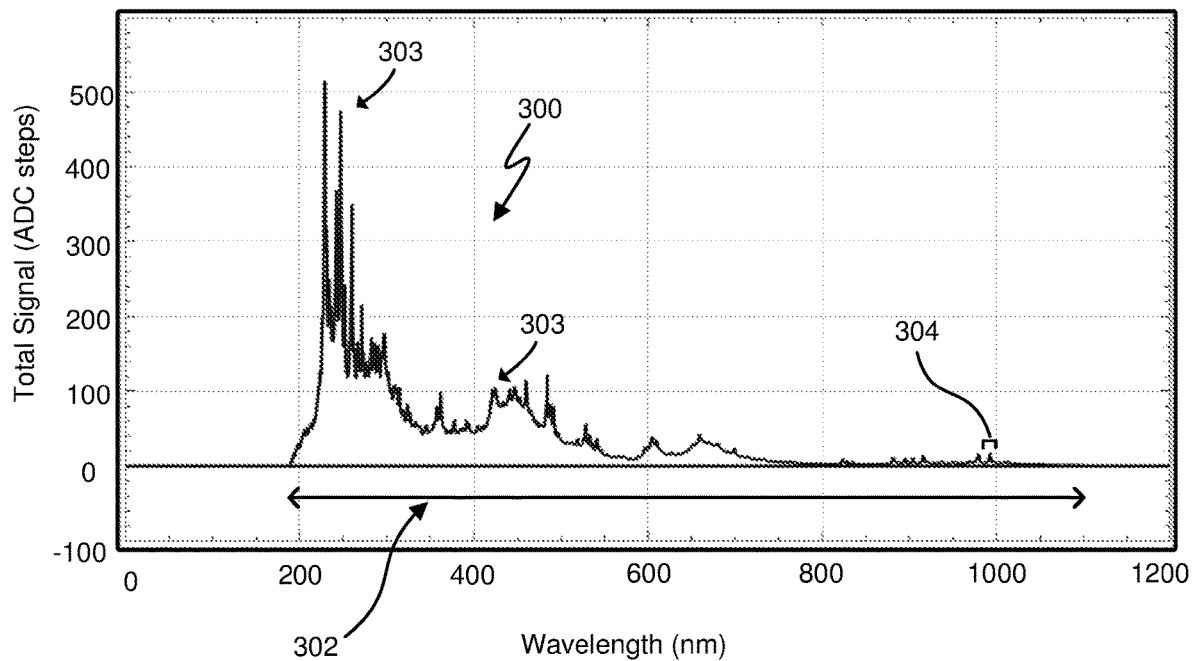
FIG. 3 is a plot of an intensity spectrum of a Xenon filled electrical arc flash lamp.

Referring to FIG. 3, an example of an intensity spectrum 300 of a Xenon-filled flash lamp is shown. Spectrum 300 may be an output spectrum obtained using the spectrophotometer 100 fitted with a Xenon-filled flash lamp 110 for use as the light source and an empty sample holder 130.

Spectrum 300 comprises a plurality of discrete emission peaks 303 and a broad continuum emission background. The discrete emission peaks 303 arise from transitions between discrete energy levels of the atomic gas and may be relatively sharp intensity features at relatively low plasma temperatures and pressures. The broad continuum emission arises from the heated plasma within the electrical-arc of the flash lamp 110. The discrete emission peaks 303 are characteristic of the gas within the flash lamp 110. For a flash lamp 110 with a known gas, such as Xenon, a plurality of emission peaks will be present at predetermined and well-known corresponding wavelengths. In principal, by comparing the wavelengths corresponding to the emission peaks 303 in the obtained spectrum 300 to the predetermined wavelengths of the characteristic emission peaks, as published in the literature, for example, the National Institute of Standards and Technology (NIST) Atomic Spectra Database (https://physics.nist.gov/asd), the spectrophotometer 100 can be calibrated. In some cases, peak broadening and shifting induced by the electric arc and high discharge temperature may add uncertainty to their use in a calibration procedure. Thus, in some embodiments, the measured spectrum may be compared with a spectrum obtained from a low pressure light source to identify which peaks have shifted and by how much. Calibration methods are described in further detail below.

FIG. 3 also shows a relatively narrow range of wavelengths 304 which is a narrow range of wavelengths relative to a wide range 302 of wavelengths. As shown in FIG. 3, the narrow range of wavelengths 304 may be a subset of wavelengths within the wide range 302. However, in some embodiments, the narrow range 304 may comprise at least some wavelengths that are not within the wide range 302. In some embodiments, the narrow range of wavelengths 304 may comprise wavelengths between about 974 nm to about 986 nm. In some embodiments, the wide range of wavelengths 302 may comprise wavelengths between about 190 nm to about 3300 nm. In some embodiments, the wide range of wavelengths 302 may comprise wavelengths between about 190 nm to about 2500 nm. In some embodiments, the wide range of wavelengths 302 may comprise wavelengths between about 190 nm to about 1100 nm.

Figure 4:
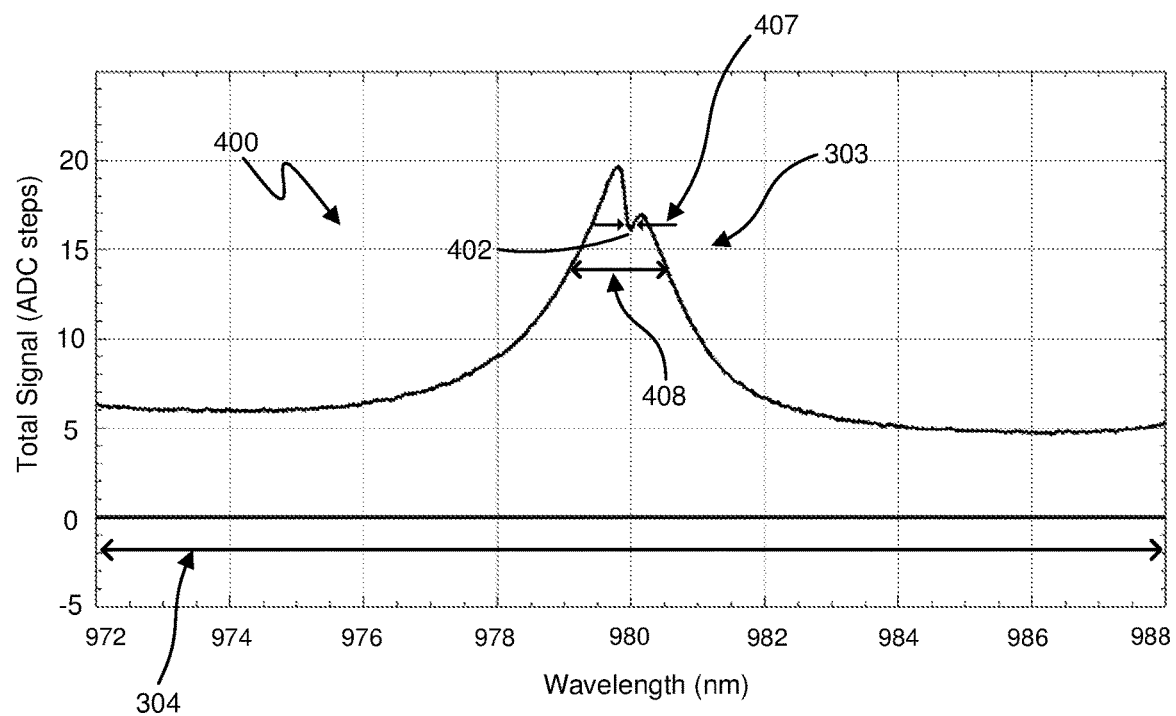
FIG. 4 is a plot of a high-resolution intensity spectrum of a relatively narrow range of wavelengths selected from the spectrum of FIG. 3.

Referring to FIG. 4, there is shown a spectrum 400, which is a close-up view of the intensity spectrum 300 over the relatively narrow range of wavelengths 304.

As shown, the intensity spectrum 400 comprises a self-absorption feature 402 at a corresponding predetermined wavelength (feature wavelength). The self-absorption feature 402 appears in the spectrum 300 as a narrow trough in intensity superimposed over a broadened emission peak 303. For example, there may be gas that forms an envelope of cooler gas around the volume of hot gas heated by the electrical arc in flash lamp 110, and the self-absorption features 402 may be present as a result of some of the emitted light from the hot gas in the flash lamp 110 being absorbed by cooler gases surrounding the hot gas. The light absorption leading to self-absorption is the reverse process to light emission described above and may also be due to electron transitions between energy levels of the gas in the flash lamp 110.

The self-absorption features are seen primarily in transitions originating in the $1^{st}$ excited state of the Xe. This low lying excited state of the Xe atom is not radiatively coupled to the ground state due to Quantum Mechanics. The low lying excited state may be a metastable state. Energy deposited into the Xe atoms by the discharge leaves some of them in this metastable state. These metastable first excited state Xe atoms around the periphery of the discharge give rise to this self-absorption effect. These metastable state Xe atoms around the periphery of the discharge being at a much lower temperature than the rest of the arc absorb light from the discharge over a narrower absorption bandwidth than the emission bandwidth from the arc and at an emission line centre wavelength that is closer to the accepted published values. Thus, the self-absorption feature may be used to calibrate the spectrophotometer as discussed in more detail below.

These features will not necessarily be common to all atomic species used in electric arc flash lamp discharges but will depend on the configuration of the low-lying energy states of the atoms involved. However, any short arc noble gas flash lamp with transverse or axially aligned electrodes would be suitable. Noble gases are typically used in flash lamps because, being inert, they tend to provide longest life for the lamp. Due to the transitions originating in the first excited state of atomic Xe as described above, Xe is a suitable atomic species, and further provides good efficiency at a relatively low pressure. Argon and Krypton may also be used. In some embodiments, mixed-gas continuous short arc high power lamps may be used.

As shown in FIG. 4, the spectral bandwidth 407 of the self-absorption feature 402 is narrower than the bandwidth 408 of the emission peak 303 that the self-absorption feature 402 is superimposed over.

Although methods for calibrating a spectrophotometer 100 are described with reference to example spectra 300, 400, the methods are not intended to be restricted to calibrating with the specific example spectra 300, 400 and reference is only made to spectra 300, 400 for illustrative and descriptive purposes.

Figure 5:
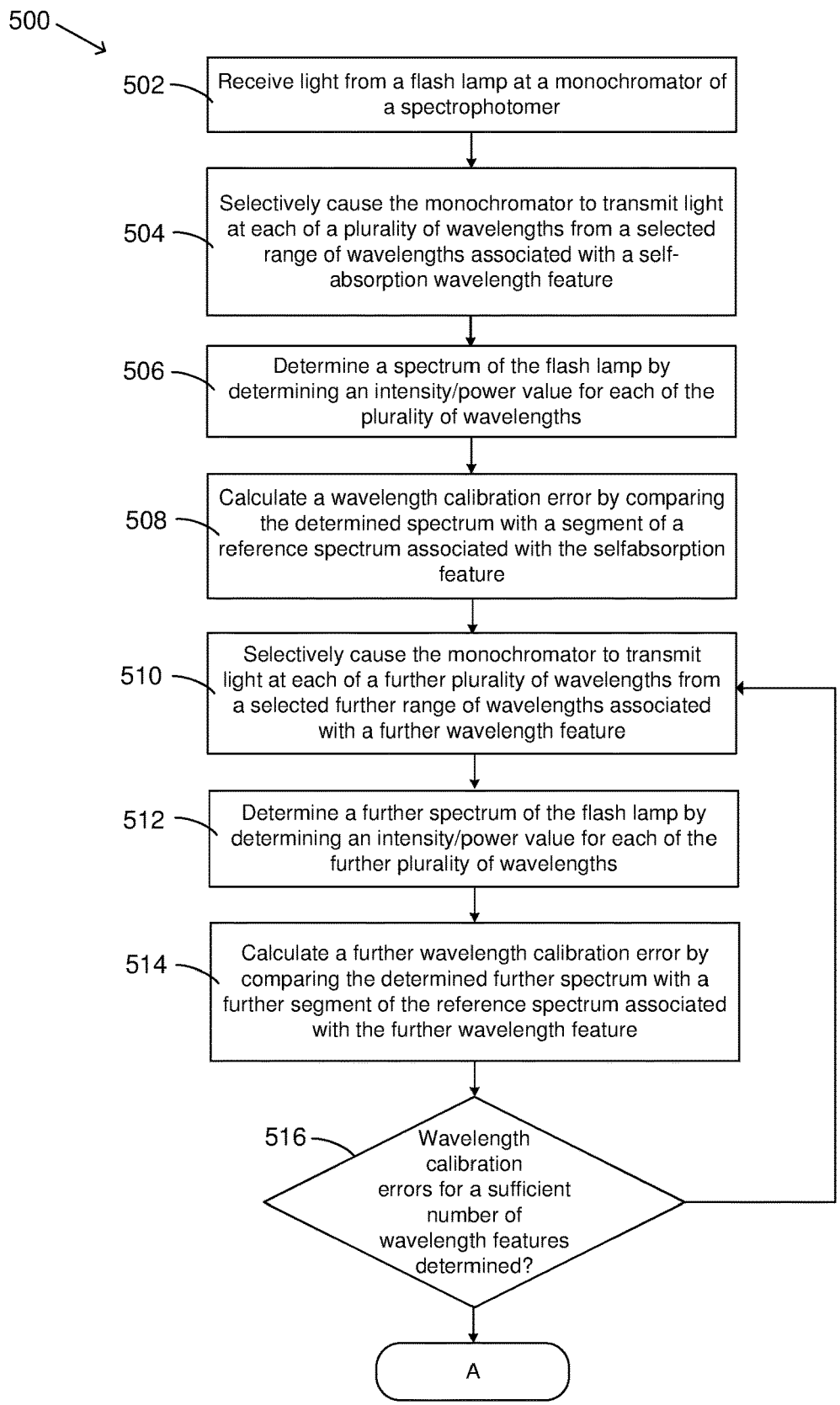
FIG. 5 is a process flow diagram of a method of calibrating the spectrophotometer of FIG. 1, according to some embodiments.
Figure 5:
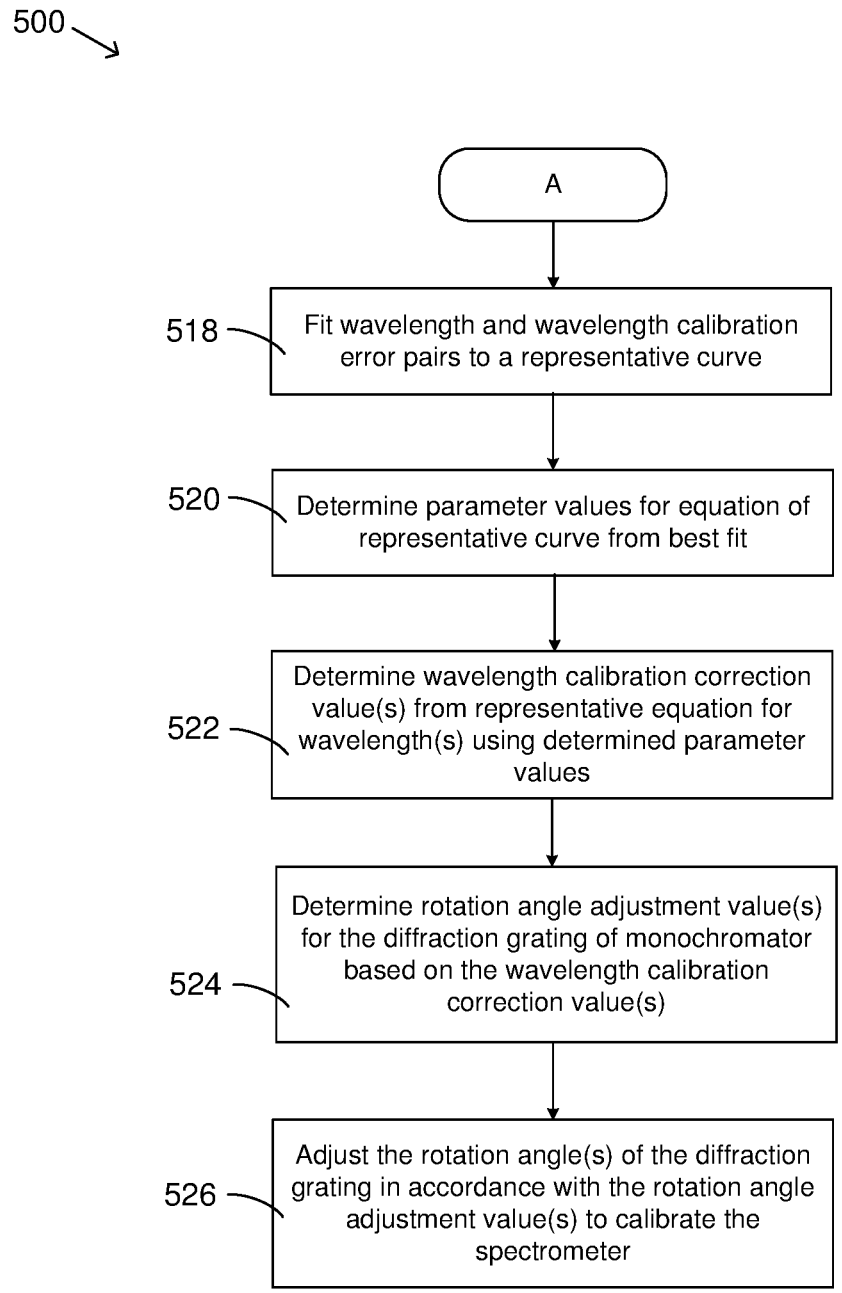

Referring to FIG. 5, there is shown a process flow-diagram for a method 500 of calibrating a spectrophotometer 100 comprising a flash lamp 110, according to some embodiments. The processor 172 may be configured to execute instructions (program code) stored in the storage medium 174 to perform the method 500.

Light 150 emitted from the flash lamp 110 comprising a known gas is received at a monochromator 120 of the optical spectrophotometer 100, at 502.

The monochromator 120 is caused or configured to progressively transmit light 160 at each of a plurality of wavelengths within or spanning a selected range of wavelengths of the light 150, at 504. The range of wavelengths is associated with a self-absorption wavelength feature 402. In some embodiments, the monochromator is configured to transmit light at each of the plurality of wavelengths by progressively varying the orientation (rotation angle, $\theta$) of at least one of the diffraction grating 204. As explained above, the processor 172 may be configured to execute instructions (program code) stored in the storage medium 174 to cause the monochromator 120 to select each of the plurality of wavelengths to progressively vary the wavelength of transmitted light 160.

The selected range of wavelengths is associated with a self-absorption feature 402 according to a known spectral profile of the flash lamp 110, which is characteristic of the type of gas of the flash lamp 110. For example, for a Xenon filled flash lamp, it is known that the wavelengths having corresponding self-absorption features may be any one or more of 823, 840, 881, 904 and 980 nm, for example. It will be appreciated however that for a Xenon filled flash lamp, other wavelengths may also have corresponding self-absorption features. The range of wavelengths may be selected such that it is substantially centred about a wavelength associated with the self-absorption feature from the known spectral profile of the flash lamp.

The selected range of wavelengths may be a relatively narrow range of wavelengths 304 selected from a relatively wider range of wavelengths 302 of the light 150 received from the flash lamp 110. For example, for a Xenon filled flash lamp, the relatively narrow range of wavelengths 304 may comprise 976 nm to around 984 nm. In some embodiments, at least some of the plurality of wavelengths of the selected range are spaced apart at a wavelength in the range of about 0.05 nm to about 0.5 nm to allow for detection of the one or more absorption features at a sufficiently high resolution, and for example, in some embodiments, to assist with the determination of the full width half maximum (FWHM) of the self-absorption feature. In some embodiments, the plurality of wavelengths spanning the range of wavelengths vary by an interval in the range of about 0.5 nm to about 15 nm.

A spectrum or partial spectrum of the flash lamp, such as spectrum 400 for example, is scanned or determined, at 506. For example, the spectrum may be determined by determining a power or intensity value corresponding to each of the plurality of wavelengths of the selected range of wavelengths. In some embodiments, the processor 172 of the computing device 170 may be configured to execute instructions to obtain data indicative of the power or intensity of light 160 detected at the detector 140 for each of the plurality of selected wavelengths. The determined spectrum may be indicative of the power or intensity of the detected light across (spanning) the relatively narrow range of wavelengths 304. The data may be recorded on a storage device or in a storage medium 174 of the computing device 170.

A wavelength calibration error value is determined by comparing the determined spectrum 400 with a segment of a predetermined reference spectrum (not shown) associated with the flash lamp 110, at 508.

Figure 7A:
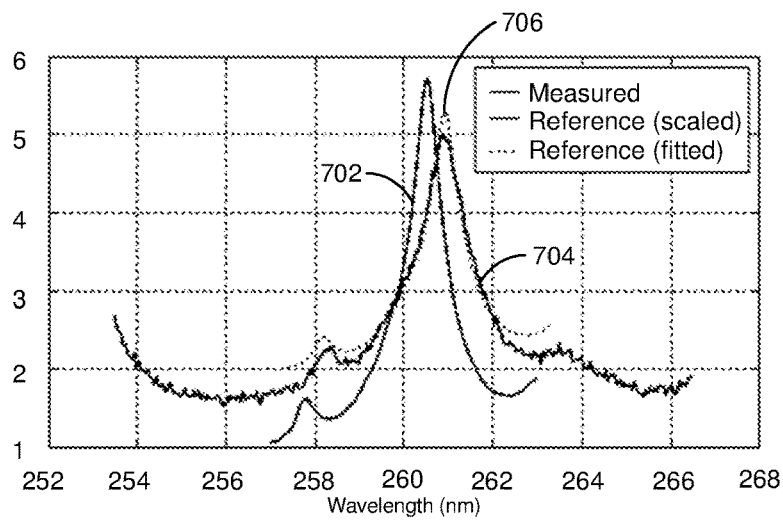
FIG. 7A is a multiple line graph illustrating an example segment of the reference spectrum corresponding to a feature wavelength of the source spectrum plotted over nominal wavelengths of reference spectrum vs intensity, and a corresponding segment of measured light intensity values for the actual wavelengths diffracted by a dispersion element such as a diffraction grating across an angular displacement centred about a nominal angular position.
Figure 7B:
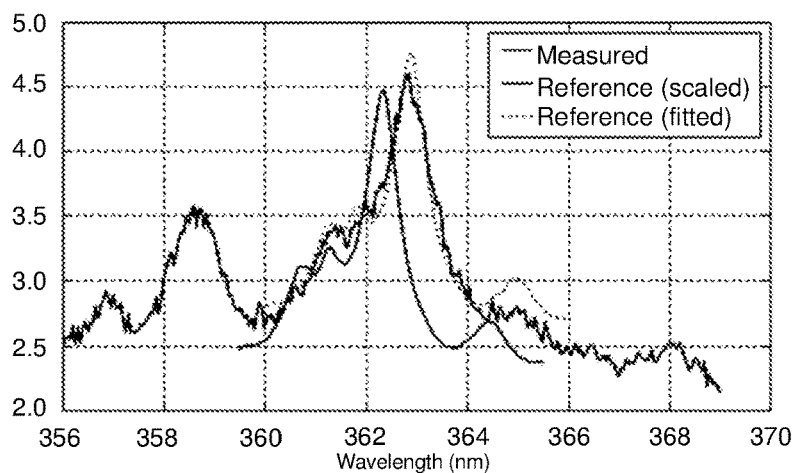
FIGS. 7B and 7C are similar to FIG. 7A.
Figure 7C:
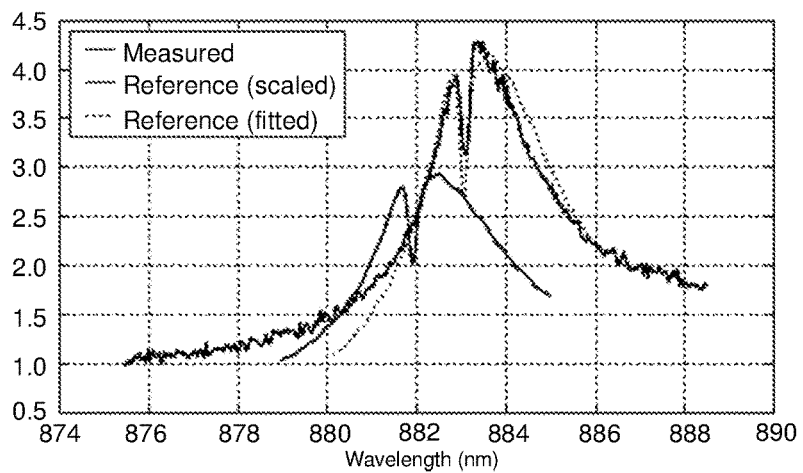

Each of the FIGS. 7A to 7C illustrate an example segment of the reference spectrum corresponding to a feature wavelength of the source spectrum plotted over nominal wavelengths of reference spectrum vs intensity, and a corresponding segment of measured light intensity values for the actual wavelengths diffracted by the second grating across an angular displacement centred about the nominal angular position.

Figure 6:
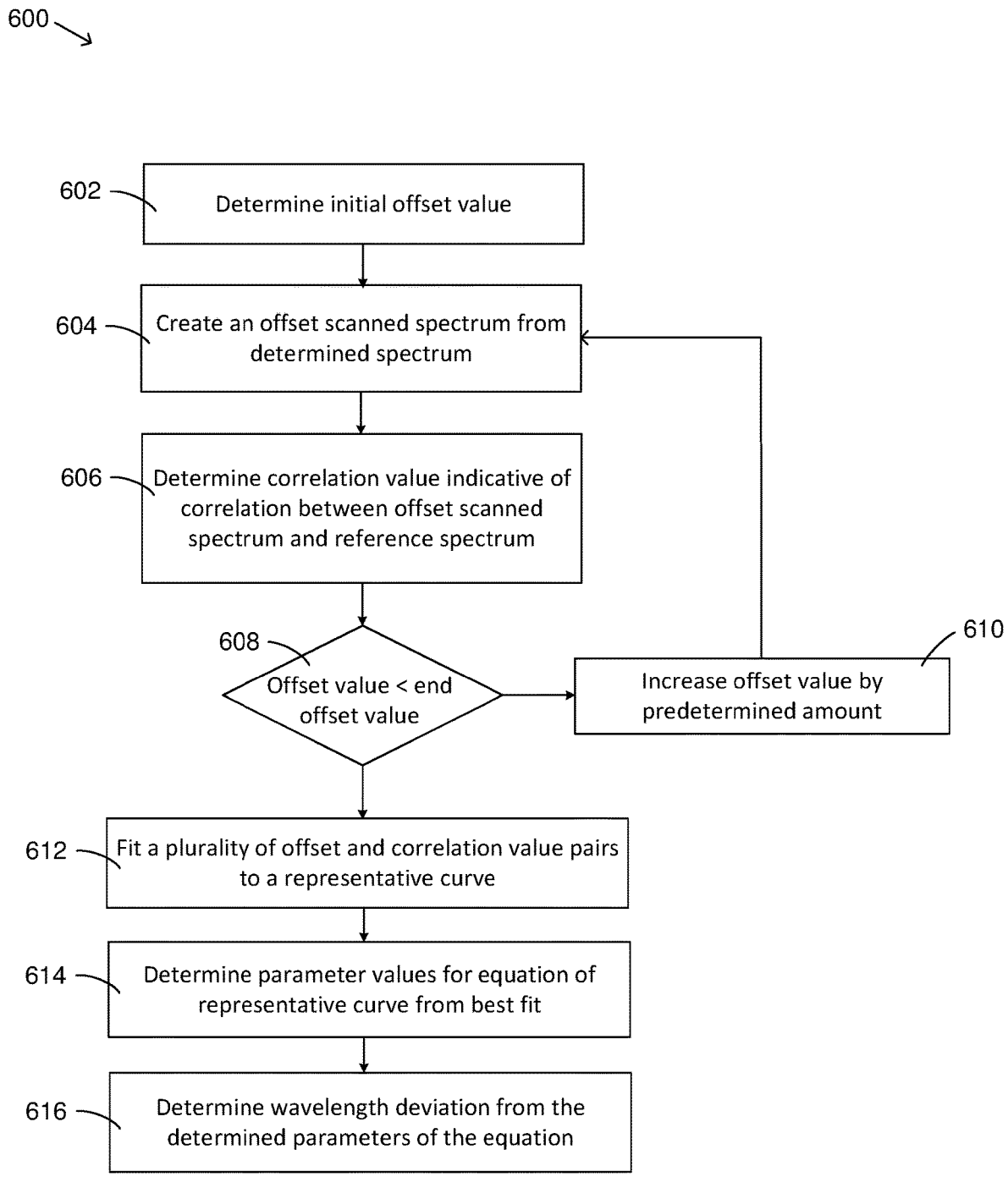
FIG. 6 is a process flow diagram of a method of determining the wavelength calibration error value for the method of FIG. 5, according to some embodiments.

The segment of the reference spectrum may span a range of wavelengths that includes or at least overlaps with the selected range of wavelengths. The predetermined reference spectrum or the segment of the predetermined reference spectrum may, for example, be stored on a non-volatile storage medium 174 of the computing device 170 or may be retrieved from remote storage. The predetermined reference spectrum or segment of the predetermined reference spectrum may have been determined by measuring intensity/power values for each of a plurality of wavelengths within a selected range and re-sampling/interpolating the measured values to correct the wavelength positions of the wavelength features (notches and peaks) using accurate published data, such as the documented emission/absorption lines recorded in the NIST Atomic Spectra Database. In some embodiments, the segment of the predetermined reference spectrum corresponds to a spectrum comprising the self-absorption feature for a Xenon filled short arc flash lamp. For example, the predetermined reference spectrum may include a self-absorption feature 402 at around 881.9 nm or 980.1 nm for Xenon gas (e.g. see FIG. 7C). A method 600 of determining the wavelength calibration error value according to some embodiments is depicted in the process flow diagram of FIG. 6. The processor 172 may be configured to execute instructions (program code) stored in the storage medium 174 to perform the method 600.

An initial offset value is determined, at 602. The offset value may be indicative of an amount by which the determined wavelength is shifted to the left or right of the wavelength of the predetermined reference spectrum. The initial offset value may be a best guess at an amount by which the wavelength of the determined spectrum deviates from the predetermined reference spectrum. In some embodiments, an offset value range comprising an initial offset value and an end offset value, as well as an offset increment amount, is determined. By performing a spectrum matching process over a range from the initial offset value to the end offset value, it is expected that an offset value in the range can be determined at which the offset spectrum and the reference spectrum can be said to "match" (i.e. are most highly correlated).

The initial offset value is set to be just larger in magnitude than the worst case wavelength deviation expected. In some embodiments, the initial offset value may be determined by summing the worst case expected errors from the tolerances of the components used to construct the spectrophotometer, and the worst case expected errors from the spectrophotometer and alignment of those components, and calculate from that a worst case wavelength error for an uncalibrated spectrophotometer. For example, if an angular accuracy of the drive component 205, the accuracy of the ruling of the diffraction grating 204, and a mechanical tolerance stack-up over the spectrophotometer's operating temperature range combined indicate that an uncalibrated spectrophotometer could be up to 2 nm in error at 980 nm, then a suitable initial offset value may be −2 nm, and a suitable end offset value may be +2 nm, knowing that any spectrophotometer's actual wavelength calibration error must lie within this range.

An offset spectrum is determined from the determined scanned spectrum, at 604. In some embodiments, the offset spectrum is determined by shifting the wavelengths of the determined scanned spectrum by the initial or current offset value. For example, as illustrated in FIG. 7A, the measured spectrum or the determined scanned spectrum 704 is offset from the reference spectrum 702 by an offset value. The relationship between the measured spectrum and the reference spectrum is further illustrated for feature wavelengths shown in FIGS. 7B and 7C.

A correlation value indicative of correlation between the offset spectrum and the predetermined reference spectrum is determined, at 606. In some embodiments, the correlation value is a measure of the linear correlation between the offset spectrum and the predetermined reference spectrum, such as a Pearson correlation coefficient. In some embodiments, offset values and associated correlation value are collated in a correlation list.

Figure 10A:
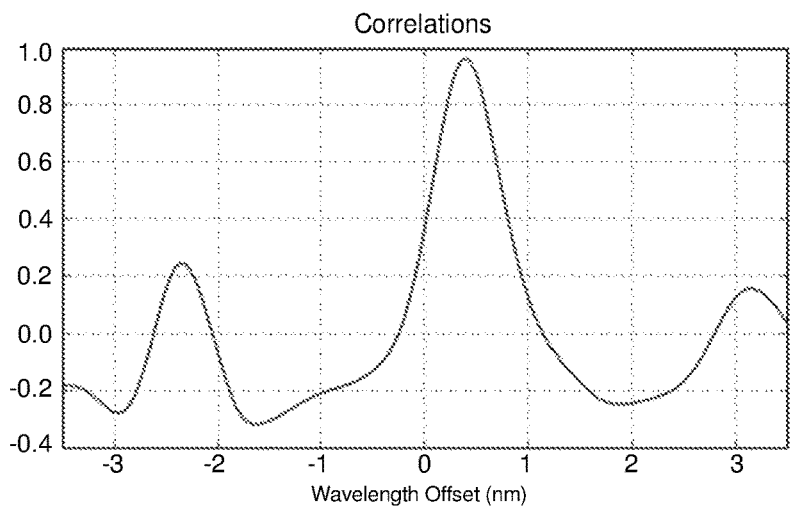
FIG. 10A is a line graph illustrating correlation values "K" corresponding to a range of expected offset values for the feature wavelength spectrum segment shown in FIG. 7A.

In one embodiment, a correlation value "K" between the offset spectrum and the reference spectrum is calculated using the Pearson correlation coefficient. The correlation value "K" is a value between −1 and 1, with a value 1 denoting perfect correlation. FIG. 10A is a graph of correlation values "K" for the range of expected offset values −3.5 nm<$\lambda_{offset}$<3.5 nm corresponding to the feature wavelength spectrum segment shown in FIG. 7A. As illustrated in FIG. 10A, the correlation value at $\lambda_{offset1}$=−3.5 nm is roughly −0.1847.

Figure 10B:
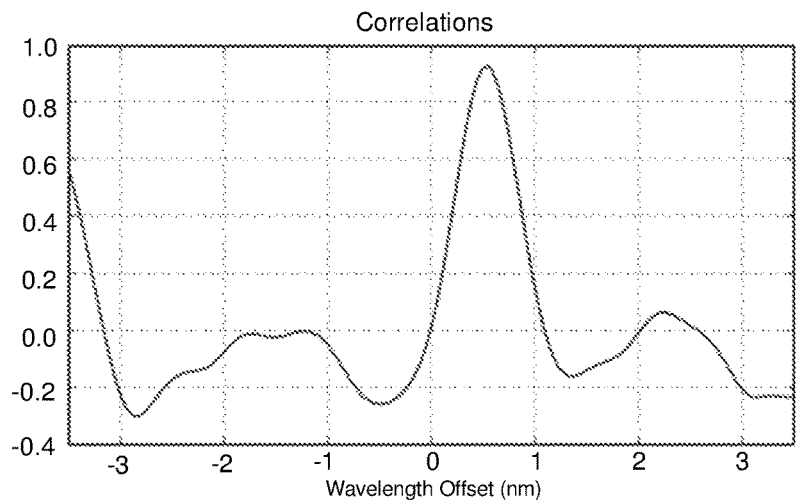
FIG. 10B is a line graph illustrating correlation values "K" corresponding to a range of expected offset values for the feature wavelength spectrum segment shown in FIG. 7B.
Figure 10C:
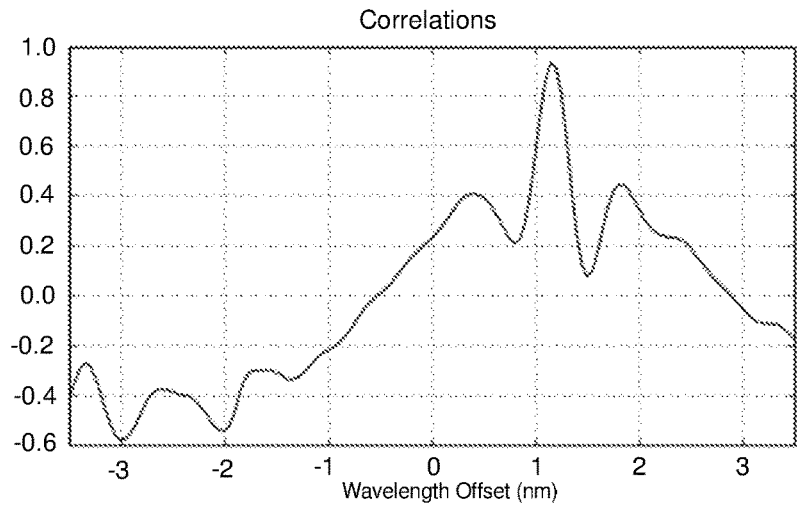
FIG. 10C is a line graph illustrating correlation values "K" corresponding to a range of expected offset values for the feature wavelength spectrum segment shown in FIG. 7C.

Similarly, FIG. 10B illustrates correlation values "K" for the range of expected offset values corresponding to the feature wavelength spectrum segment shown in FIG. 7B; and FIG. 10C illustrates correlation values "K" for the range of expected offset values corresponding to the feature wavelength spectrum segment shown in FIG. 7C.

If a sufficient number of correlation values has not been determined, at 608, for example, where a current offset value is less than the end offset value, the offset value is incremented by the offset increment amount at 610, and the method reverts to 604 to determine further offset value and associated correlation value pairs.

Figure 9:
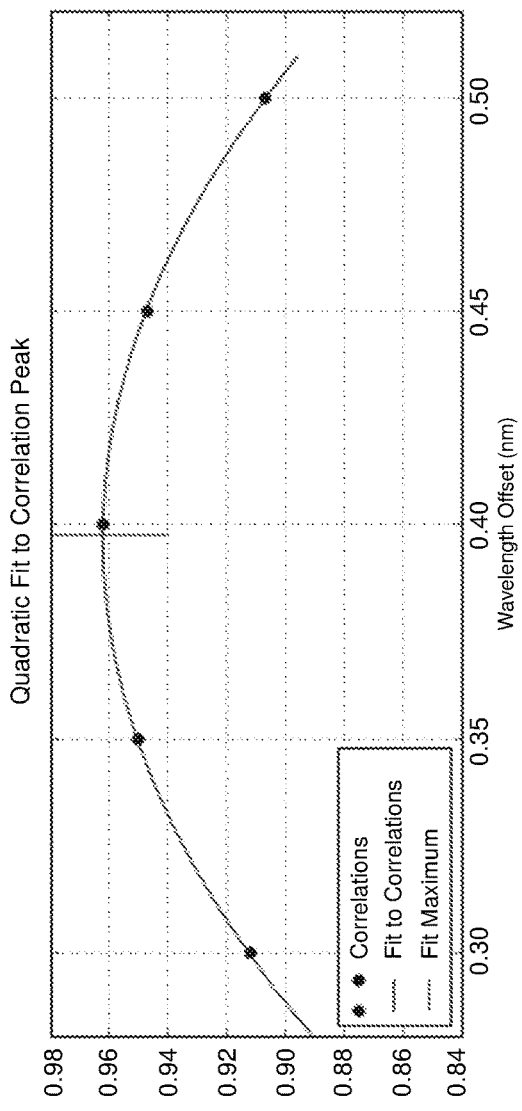
FIG. 9 provides a scatter plot illustrating correlation values "K" between the expected light intensity spectrum over a band of wavelengths centred on a given wavelength and the measured light intensity spectrum over a band of wavelengths centred on the corresponding wavelength with an offset $\lambda_{offset}$ applied.

If a sufficient number of correlation values has been determined, at 608, for example, in that a current offset value is not less than the end offset value, a plurality of the offset value and correlation value pairs are fit to a representative curve, at 612. For example, the representative curve may be a least squares quadratic curve based on the equation below and the least squares quadratic curve as shown in FIG. 9:

$$\text{correlation} = A\lambda_{offset}^2 B\lambda_{offset} + C + \text{error}$$

In some embodiments, only a subset of the determined offset value and correlation value pairs are fit to the representative curve. In some embodiments, a maximum correlation value of the determined correlation values is identified and the subset of offset value and correlation value pairs is centred on the maximum correlation value. For example, the subset may comprise 5 offset value and correlation value pairs, two on either side of the offset value and maximum correlation value pair. In some embodiments, if the maximum correlation is less than a threshold amount, such as 0.95, for example, the method 600 may terminate with an error. Similarly, in some embodiments, if either of the first or last two of the offset value and correlation value pairs includes the identified maximum correlation value, the method 600 may terminate with an error.

Parameter values for the representative curve are determined from the best fit of the offset value and correlation value pairs to the representative curve, at 614. For example, the determined parameters may be A and B of the above quadratic equation.

Determine wavelength deviation value is determined from determined parameters of the equation for the representative curve, at 616. For example, the wavelength deviation value may be determined from the following equation:

$$\delta\lambda = -\frac{B}{2A}$$

Referring again to FIG. 5, the monochromator 120 is caused or configured to progressively transmit light 160 at each of a second or further plurality of wavelengths within or spanning a selected second or further range of wavelengths of the light 150. The second or further range of wavelengths is associated with a further wavelength feature such as a second or further self-absorption feature (not shown) or an emission peak 303, at 510. In some embodiments, the monochromator 120 is configured to transmit light at each of the plurality of wavelengths by progressively varying the orientation (rotation angle, θ) of the diffraction grating 204. As explained above, the processor 172 may be configured to execute instructions (program code) stored in the storage medium 174 to cause the monochromator 120 to select each of the plurality of wavelengths to progressively vary the wavelength of transmitted light 160.

The selected second or further range of wavelengths is associated with a further wavelength feature, such as a second or further self-absorption feature or an emission peak 303, according to a known spectral profile of the flash lamp 110, which is characteristic of the type of gas of the flash lamp 110. The selected second range of wavelengths may be a relatively narrow range of wavelengths selected from a relatively wider range of wavelengths of the light 150 received from the flash lamp 110. The size of the selected range 304 may depend on the specific known wavelength feature of the predetermined spectrum 400. For example, a broad wavelength feature may require a broad range of wavelengths 304. In some embodiments, at least some of the second or further plurality of wavelengths of the selected range are spaced apart from neighbouring wavelengths at about 0.05 nm to about 0.5 nm. In some embodiments, the plurality of wavelengths spanning the range of wavelengths vary by an interval in the range of about 0.5 nm to about 15 nm.

A further spectrum of the flash lamp is scanned or determined, at 512. In some embodiment, the further spectrum is determined by determining or measuring power or intensity value for each of the second or further plurality of wavelengths. For example, the processor 172 of the computing device 170 may be configured to execute instructions to obtain data indicative of the power or intensity of light 160 detected at the detector 140 for each of the second or further plurality of selected wavelengths. For example, the second or further spectrum may be indicative of the intensity of the detected light across (spanning) the relatively narrow second range of wavelengths. The data may be recorded on a storage device or in a storage medium 174 of the computing device 170.

A further wavelength calibration error value is determined by comparing the determined further spectrum 400 with a relevant segment of a predetermined reference spectrum (not shown) associated with the flash lamp 110, at 516.

In some embodiments, if wavelength calibration errors for a sufficient number of wavelength features have not been determined, the method 500 reverts to 510, to determine a wavelength calibration error for a further wavelength feature. If wavelength calibration errors for a sufficient number of wavelength features (wavelength and wavelength calibration error pairs) has been determined, the method 500 proceeds to 518. A sufficient number of wavelength calibration errors may be a number greater than a threshold value. For example, the threshold value may depend on the design and/or requirements of the spectrophotometer.

For example, a number of calibration error values necessary used to fit a representative error curve may depend on the calibration accuracy required, the forms of errors that are being modeled and corrected for, and/or a size of other error sources that are not being modeled. In some embodiments, a primary error being corrected for may relate to an eccentricity of mechanical placement of an encoder pattern with respect to a grating rotation shaft of the spectrophotometer. Typically, a form of this type of error is sinusoidal, but over a range of angles used, it may be adequately modeled by a simple parabola. In such a case, three calibration error values may be sufficient to define the correction. However, there may also be a secondary source of error in cyclic interpolation errors on the encoders, which may be treated as a source of random error. Lamp flash noise and/or measurement noise may also be treated as a source of random error. In some embodiments, to mitigate unmodelled errors arising from cyclic interpolation errors, flash lamp noise and/or measurement noise, for example, contributing some excessive errors at wavelengths at a relatively long distance from three calibration error values, more than three calibration error values may be determined for fitting to the representative curve at 518. For example, in some embodiments, a zero order peak and eleven further feature wavelengths are used, which may be selected at relatively rough uniform spacing to constrain the fitted parabola and limit errors arising from small random errors. In some embodiments, conventional software modeling and Monte-Carlo simulation processing may be employed to determine a suitable number of wavelength features (wavelength and wavelength calibration error pairs).

Figure 8:
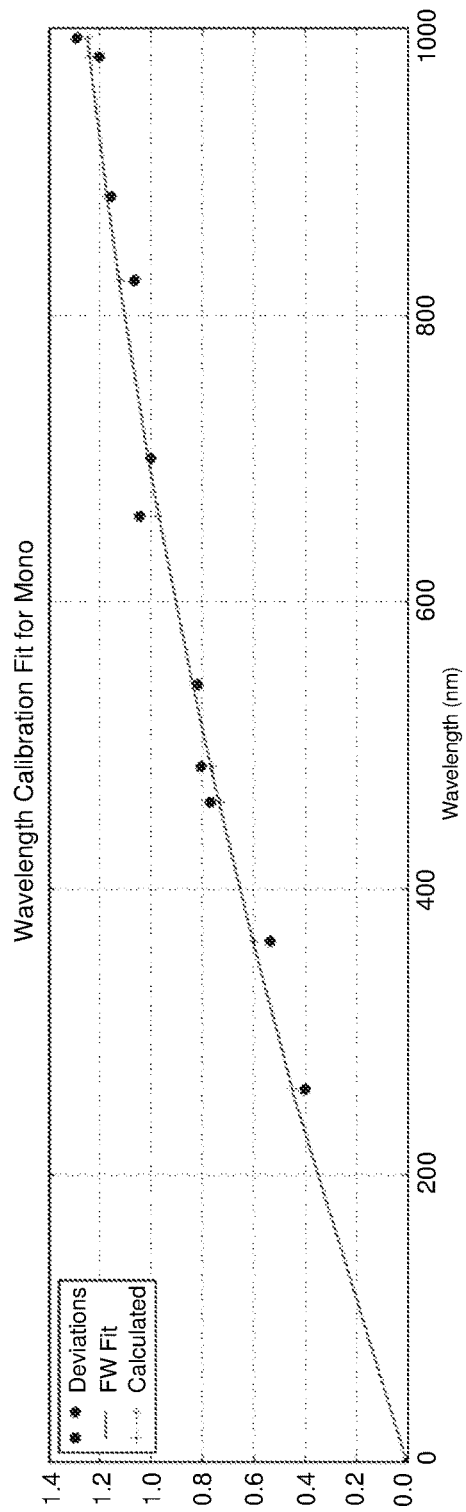
FIG. 8 provides a scatter plot illustrating the measured wavelength error (E) at various wavelengths between a scanned spectrum and the reference spectrum.

The wavelength and wavelength calibration error pairs determined at 508 and 514 (which may be collated as a wavelength calibration error list) are fit to a representative curve as shown in FIG. 8. In some embodiments, the wavelength and wavelength calibration error pairs are fit to a least squares quadratic curve with zero offset, such as:

$$\delta\lambda = E\lambda^2 + F\lambda + \text{error}$$

In one embodiment, an array ($\lambda$, $\delta\lambda$) is populated with a wavelength value $\lambda$, for each feature wavelength and a corresponding wavelength deviation/difference/error $\delta\lambda$ (correlation value) associated with the feature wavelength. A least squares quadratic curve with the (0, 0) offset is fitted to the ($\lambda$, $\delta\lambda$) array as shown in FIG. 8. As shown in FIG. 8, the scatter plot illustrates the values of array ($\lambda$, $\delta\lambda$) and the line graph is the curve of best fit.

Parameter values, such as E and F, are determined from a best fit of the curve to the wavelength and wavelength calibration error pairs, at 520. Curve fitting to determine the parameter values may comprise optimising the parameters values to minimise the error.

A wavelength calibration error value for any particular wavelength is determined from the representative equation using the determined parameter values, at 522.

A rotation angle adjustment value for the diffraction grating 204 is determined based on the wavelength calibration error value, at 524. For example, the rotation angle adjustment value may be determined using the grating equation discussed above. In some embodiments, the rotation angle adjustment value may be further dependent on the temperature within the spectrophotometer 100. For example, the rotation angle adjustment value for the diffraction grating 204 may be further based on the temperature determined from the temperature sensor provided within the spectrophotometer 100.

The rotation angle of the diffraction grating 204 of the monochromator is adjusted by the rotation angle adjustment value, at 526, to thereby calibrate the spectrometer to cause the monochromator to transmit light at the calibrated wavelength. For example, the processor 172 of the computing device 170 may be configured to execute instructions to adjust the diffraction grating 204 of the monochromator by the rotation angle adjustment.

The implementation of the aforementioned calibration method in a double monochromator is described in Australian provisional application no. 2018904139 (the contents of which are incorporated herein by reference). As described with reference to FIGS. 3 to 13c of Australian provisional application no. 2018904139, each of the monochromators is calibrated by first determining the respective zero order angles. Once the respective zero order angles are determined, each of the monochromators is calibrated using the aforementioned calibration method whilst the other monochromator is set to its zero order position.

In some embodiments, the calibration method can also be used to calibrate monochromators including two or more dispersion elements, wherein each dispersion element may include one or more diffraction gratings and/or one or more prisms in any suitable configuration.

Whilst the above example embodiments have been described with reference to spectrophotometers, a person skilled in the art would also understand that the calibration method can also be used to calibrate monochromators in different optical apparatus such as telescopes, colour measuring instruments and medical apparatus.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:
1. A method of calibrating a spectrophotometer comprising a flash lamp, the method comprising:

receiving light from the flash lamp at a monochromator of the spectrometer, wherein the flash lamp is a short arc noble gas flash lamp with transverse or axially aligned electrodes;

configuring the monochromator to progressively transmit the received light at each of a plurality wavelengths of a selected range of wavelengths, wherein the range of wavelengths is associated with a wavelength feature according to a known spectral profile of the flash lamp, and wherein the wavelength feature is a self-absorption feature;

determining a spectrum of the flash lamp, wherein the spectrum comprises a corresponding power or intensity value for each of the plurality of wavelengths;

determining a wavelength calibration error value for the wavelength feature by comparing the spectrum with a segment of a predetermined reference spectrum associated with the flash lamp, wherein the segment of the predetermined reference spectrum includes one or more wavelengths associated with the self-absorption feature; and calibrating the spectrophotometer based on the wavelength calibration error value.

2. The method of claim 1, wherein the range of wavelengths is selected to be substantially centred about a wavelength associated with the self-absorption feature from the known spectral profile of the flash lamp.

3. The method of claim 1, further comprising:
determining one or more further wavelength calibration errors; and
calibrating the spectrophotometer based on the first wavelength calibration error value and the one or more further wavelength calibration errors.

4. The method of claim 3, wherein determining one or more further wavelength calibration errors comprises:
configuring the monochromator to progressively transmit the received light at each of a further plurality wavelengths of a selected further range of wavelengths, wherein the further range of wavelengths is associated with a further wavelength feature according to a known spectral profile of the flash lamp;
determining a further spectrum of the flash lamp, wherein the further spectrum comprises a corresponding power or intensity value for each of the further plurality of wavelengths;
determining a further wavelength calibration error value for the further wavelength feature by comparing the further spectrum with a further segment of a predetermined reference spectrum associated with the flash lamp, wherein the further segment of the predetermined reference spectrum includes one or more wavelengths associated with the further wavelength feature.

5. The method of claim 4, wherein the further wavelength feature comprises one or more of (i) a further self-absorption feature and (ii) an emission feature.

6. The method of claim 3, wherein the method further comprises:
selecting a plurality of calibration error value and associated wavelength pairs, wherein the plurality of pairs includes the first wavelength calibration error value and at least two of the one or more further wavelength calibration errors;
fitting the plurality of calibration error value and associated wavelength pairs to a least squares quadratic curve to determine parameter values for a representative equation of the curve; and determining the wavelength calibration error value for a particular wavelength from the representative equation using the determined parameter values.

7. The method of claim 6, wherein the representative equation is:

$$\delta\lambda = E\lambda^2 + F\lambda +,$$

wherein $\delta\lambda$ is the wavelength calibration error, $\lambda$ is the associated wavelength and E and F are the parameter values.

8. The method of claim 1, wherein determining the wavelength calibration error value for a wavelength feature comprises:
determining a plurality of offset spectra from the determined spectrum, wherein each offset spectrum is associated with a corresponding offset value;
determining a plurality of correlation values indicative of a correlation between each of the plurality of the offset spectra and the segment of the predetermined reference spectrum;
determining a best fit of at least a subset of correlation values and corresponding offset value pairs to a representative correlation curve to determine correlation parameter values for the representative correlation curve; and
determining the wavelength calibration error value for wavelength feature based on the determined correlation parameter values.

9. The method of claim 8, further comprising determining a maximum correlation value of the determined correlation values and centring the subset of offset value and correlation value pairs on the maximum correlation value.

10. The method of claim 8, wherein the offset spectrum comprises a version of the determined spectrum wherein the wavelengths have been shifted by an offset value.

11. The method of claim 1, wherein the monochromator is configured to transmit light at each of the plurality of wavelengths by progressively varying the rotation angle of at least the diffraction grating of the monochromator of the spectrophotometer.

12. The method of claim 1, wherein calibrating the spectrophotometer comprises determining a rotation angle adjustment value based on the wavelength calibration error value and adjusting a rotation angle of the diffraction grating of the monochromator of the spectrometer by the rotation angle adjustment value.

13. The method of claim 1, wherein the flash lamp comprises Xenon gas.

14. The method of claim 1, wherein configuring the monochromator to progressively transmit the received light at each of a plurality wavelengths of a selected range of wavelengths comprises configuring the monochromator to scan at a relatively high resolution.

15. The method of claim 1, wherein at least some of the plurality of wavelengths of the selected range are spaced apart at a wavelength in the range of about 0.05 nm to about 0.5 nm.

16. A method of calibrating a spectrophotometer comprising a flash lamp, the method comprising:
receiving light from the flash lamp at a monochromator of the spectrometer, wherein the flash lamp is a short arc noble gas flash lamp with transverse or axially aligned electrodes;
configuring the monochromator to progressively transmit the received light at each of a plurality wavelengths of a selected range of wavelengths, wherein the range of wavelengths is associated with a wavelength feature according to a known spectral profile of the flash lamp, and wherein the wavelength feature is a self-absorption feature;

determining a spectrum of the flash lamp, wherein the spectrum comprises a corresponding power or intensity value for each of the plurality of wavelengths;

considering the self-absorption feature of the determined spectrum as an inverted peak;

evaluating a peak centre of the inverted peak;

calibrating the spectrophotometer based on the evaluated peak centre.

17. A spectrophotometer comprising:

a short arc noble gas flash lamp with transverse or axially aligned electrodes;

a monochromator arranged to receive light from the flash lamp and to progressively transmit light at each of a plurality of selected wavelengths from a range of wavelengths;

a detector arranged to detect a corresponding intensity value for each of the first plurality of selected wavelengths; and a computing device comprising a processor and a storage medium, wherein the processor is configured to execute instructions stored on the storage medium to cause the spectrophotometer to perform the method according to claim 1.

* * * * *